United States Patent [19]
Doi et al.

[11] 3,957,903

[45] May 18, 1976

[54] NOVEL SOLID THERMOSETTING RESINS AND PROCESSES FOR PREPARING SAME

[75] Inventors: Kazuo Doi, Ohsaka; Takeru Murakami; Yoshinobu Nakano, both of Neyagawa, all of Japan

[73] Assignee: Matsushita Electric Works, Ltd., Kadoma, Japan

[22] Filed: July 3, 1974

[21] Appl. No.: 485,607

Related U.S. Application Data

[63] Continuation of Ser. No. 200,557, Nov. 19, 1971, abandoned.

[30] Foreign Application Priority Data

| Nov. 24, 1970 | Japan | 45-103440 |
|---|---|---|
| Nov. 24, 1970 | Japan | 45-103442 |
| Nov. 24, 1970 | Japan | 45-103444 |
| June 30, 1971 | Japan | 46-48387 |
| June 30, 1971 | Japan | 46-48388 |

[52] U.S. Cl. ............... 260/836; 156/306; 260/32.8 R; 260/33.6 R; 428/210; 428/271; 428/430; 428/443; 428/481

[51] Int. Cl.² ......................................... C08G 49/00

[58] Field of Search ........................ 260/836, 837

[56] References Cited

UNITED STATES PATENTS

| 3,515,772 | 6/1970 | Lubowitz | 260/836 |
|---|---|---|---|
| 3,616,193 | 10/1971 | Lubowitz | 260/836 |
| 3,635,891 | 1/1972 | Lubowitz | 260/47 EP |
| 3,636,141 | 1/1972 | O'Neill | 260/880 R |
| 3,660,525 | 5/1972 | Kawahara | 260/836 |
| 3,676,526 | 7/1972 | Sommerfeld | 260/836 |
| 3,860,672 | 1/1975 | Lagally | 260/837 |

*Primary Examiner*—Murray Tillman
*Assistant Examiner*—T. Pertilla
*Attorney, Agent, or Firm*—Lane, Aitken, Dunner & Zeims

[57] ABSTRACT

A two-stage process for producing a three-component graft copolymer of 1,2-polybutadiene, glycidyl methacrylate and a second monomer. By first reacting glycidyl methacrylate on the polymeric substrate and then reacting the second monomer to form a non-crosslinked graft copolymer, high curing rates are obtained. By forming a solvent solution of the grafted product, an epoxy hardener and a radical polymerization initiator, a varnish suitable for forming dielectric prepregs is obtained.

8 Claims, No Drawings

NOVEL SOLID THERMOSETTING RESINS AND PROCESSES FOR PREPARING SAME

CROSS-REFERENCE TO RELATED APPLICATION

This application is a continuation of our copending application U.S. Ser. No. 200,557, filed Nov. 19, 1971 now abandoned and entitled "Novel Solid Thermosetting Resins and Processes for Preparing Same." It also claims priority of Japanese applications No. 103440/70 filed Nov. 24, 1970, No. 103442/70 filed Nov. 24, 1970, No. 103444/70 filed Nov. 24, 1970, No. 48387/71 filed June 30, 1971, and No. 48388/71 filed June 30, 1971.

BACKGROUND OF THE INVENTION

The demand for substrate materials for use in printed circuits has increased drastically with the development of printed circuitry in the electronics industry. As resins for such substrates phenolic resins, epoxy resins and other thermosetting resins have been used commercially because of their reasonable costs and good performance. However, the use of phenolic resins suffers the defect that, due to their poor adhesiveness to copper foils, the copper foils must be precoated with an adhesive. As a consequence, at present, epoxy resins are used in large quantities for this purpose. These epoxy resins, however, are not very satisfactory in their electrical properties. On the other hand, the 1,2-polybutadienes show excellent electrical properties. The latter resins, however, occur in the form of viscous liquids having low cure rates and do not show satisfactory adhesion to copper foils, which fact renders them difficult to use in printed circuit applications. Due to the large number of double bonds in their structure, 1,2-polybutadienes may be polymerized with a radical polymerization catalyst to produce thermosetting resins. In fact, however, the 1,2-polybutadienes exhibit very low curing rates, so that attempts to cure them by the use of a peroxide as an oxidizing agent together with a metal naphthenate as a cocatalyst result in an insufficiently cured product. Attempts to perfect curation require treatment at high temperatures over a long period of time, and are therefore unsuitable from the standpoint of commercial use.

SUMMARY OF THE INVENTION

This invention relates to a process for the preparation of graft copolymers by the grafting of glycidyl methacrylate and, subsequently, another polymerizable monomer onto a substrate of a diisocyanate modified 1,2-polybutadiene glycol having pendant double bonds. The process of the present invention is a two-stage solution polymerization technique.

In the first stage the isocyanate modified polybutadiene glycol is dissolved in a common organic solvent and reacted with glycidyl methacrylate in the presence of a radical polymerization initiator. The product of the first stage reaction is a grafted copolymer which is not crosslinked. A solution polymerization technique is employed wherein the glycidyl methacrylate grafts onto the pendant double bond containing groups without cross-linking or bridging the linear molecules of the substrate. The product of the first stage is a prepolymer which is not the desired product thermosetting resin. The grafted copolymers resulting from the first stage are characterized by a plurality of units represented by the following structural formula:

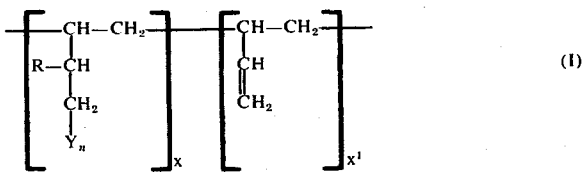

wherein:
R is the residue of the radical polymerization initiator
Y is glycidyl methacrylate $x$, $x^1$, n are positive integers Note: Groups of $x$ and $x^1$ are located at random rather than in blocks In the second stage a second monomer is reacted with the graft product of the first stage. The charging molar ratio of the second monomer to glycidyl methacrylate may vary from 6:4 to 9:1. The product of the second stage is a solid thermosetting resin which is not crosslinked and can be dissolved in common organic solvents such as benzene, xylene and toluene, and can be softened by heat. The thermosetting resin is cured by heating in the presence of an epoxy hardner and a radical polymerization initiator. The thermosetting resin resulting from the second stage are characterized by a plurality of units represented by the following structural formula:

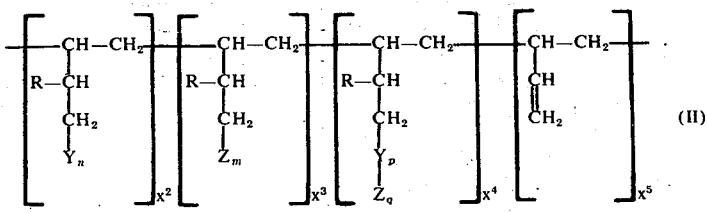

wherein:
R is the residue of the radical polymerization initiator
Y is glycidyl methacrylate Z is the second monomer $x^2$-$x^5$, $n$, $m$, $p$ and $q$ are positive integers Note: Groups of $x^2$, $x^3$, $x^4$ and $x^5$ are located at random rather than in blocks Accordingly it is an object of the present invention to provide a process for the preparation of novel thermosetting resins having high adhesive strength to copper foils, excellent solvent resistance and electrical properties as well as high resistance to chemicals.

It is a further object of the present invention to provide graft copolymers of 1,2-polybutadienes having a high curing rate.

Other objects and further scope of applicability of the present invention will become apparent from the detailed description to follow.

DESCRIPTION OF THE PREFERRED EMBODIMENTS

The polybutadiene glycol starting materials of the present invention have a predominantly 1,2-type structure, i.e. about 50 mole % or more, and preferably 80 mole % or more, of the double bond containing groups are present in the form of pendant groups. Such a structure may be represented by the following:

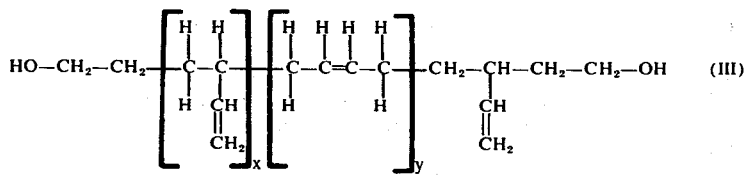

$x = > 50$ mole %, $y = < 50$ mole %

The terminal groups of the liquid 1,2-polybutadiene employed here are at least 60%, preferably more than 80%, hydroxy.

The molecular weight of the liquid 1,2-polybutadiene glycol used in the present invention is increased by reaction with a diisocyanate compound. As a consequence, urethane bonds are introduced into the structure of the resin, which results in an increase in the melt viscosity of the resin (evident in subsequent molding). The molecular weight of the liquid 1,2-polybutadiene glycol is increased in this manner because polybutadiene glycols with higher molecular weights are difficult to prepare industrially, thus commercially available 1,2-polybutadiene glycols are of a molecular weight in the range of 1000 up to 3000. The use of such low molecular weight resins cannot afford sufficient melt viscosity or toughness for use as substrates copper clad elements. The liquid 1,2-polybutadiene glycol is reacted with a diisocyanate compound preferably in an amount to provide 2/3 to 9/10 mole of isocyanate groups per mole of the hydroxy groups of the 1,2-polybutadiene glycol. If less than 2/3 mole is reacted the molecular weight is not sufficiently increased, while use of more than 9/10 mole results in a molecular weight so high that the resultant product has poor solubility in organic solvents, which lack of solubility inhibits the subsequent graft reaction.

Diisocyanate compounds suitable for reaction with the hydroxyl groups of 1,2-polybutadiene glycol include 2,4-toluene diisocyanate, 2,6-toluene diisocyanate, diphenyl-methane diisocyanate, trimethylene diisocyanate, pentamethylene diisocyanate, hexamethylene diisocyanate and mixtures thereof. The reaction may be conducted in the absence or presence of a solvent, e.g. benzene, toluene, xylene or like aromatic hydrocarbons, chloroform, carbon tetrachloride, monochlorobenzene or like chlorinated hydrocarbons. In general, the reaction temperature may vary anywhere from room temperature to 140°C. With a reaction temperature within that range, the preferred reaction time is 3–6 hours. The urethanated 1,2-polybutadiene thus obtained is a prepolymer, represented by structural formula (IV) shown below.

(IV) urethanated 1,2-polybutadiene

The urethanated 1,2-polybutadiene glycol is grafted with glycidyl methacrylate (GMA) and another polymerizable monomer in two stages. The urethanated product may be reacted with glycidyl methacrylate and the other polymerizable monomer in proportions to provide 0.35 to 1.1 mole, or preferably 0.35 to 0.9 mole, total monomer grafted per mole of pendant double bond containing groups in the urethanated product. The most preferred range is 0.5 to 0.8 mole. When the total amount of the glycidyl methacrylate and the other polymerizable monomer is less than 50 mole %, sufficiently high rates of curing are not obtainable and the melt viscosity is too low. On the other hand, when the monomers total more than 80 mole % the viscosity of the reaction liquid becomes excessively high.

To obtain a degree of graft copolymerization within the above mentioned range of 0.35 to 1.1 mole it is necessary that the total amount of monomers added to the reaction system be within the range of 0.4 to 1.2 mole per mole of pendant vinyl groups in the polymer. To obtain grafting within the preferred range of 0.35 to 0.9 mole, it is necessary to add 0.4 to 1.0 mole per mole pendant vinyl groups.

The molar ratio of the gylcidyl methacrylate to the other polymerizable monomer added to the reaction mixture is within the range of from 1:9 to 2:3. When the ratio of glycidyl methacrylate to the other polymerizable monomer is lower than 1:9 the resin products are not sufficiently adhesive to copper foils. On the other hand, when this latter ratio is higher than 2:3, the grafting reaction becomes unstable and something like a gelled product forms.

As previously noted, an important characteristic of the present invention is that the grafting reaction of glycidyl methacrylate and the second polymerization monomer onto the unrethanated substrate occurs in two stages. In the first stage the glycidyl methacrylate is reacted or grafted onto the urethanated substrate (a polymeric oil) and in the second stage the second polymerizable monomer is added and reacted. On the basis of the relative copolymerizability of glycidyl methacrylate and other polymerizable monomers such as chlorostyrene, it would seem that the simultaneous reaction of a mixture of both monomers with the urethanated substrate would be successful. As a matter of fact, however, at high reaction rates the reactivity of glycidyl methacrylate is much lower than that of chlorostyrene with the result that unreacted glycidyl methacrylate

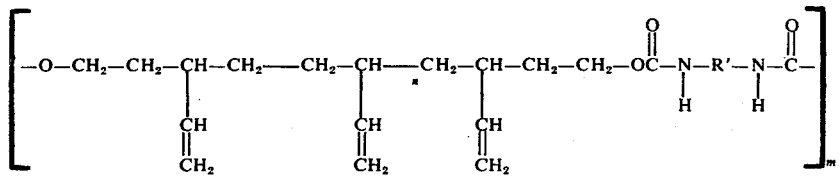

wherein R' = diisocyanate Residue monomer remains in the product in increasing amounts as the reaction rate rises. The presence of this unreacted monomer gives rise to adverse influences on the human body, i.e. poisoning, thus significantly limiting the usefulness of the resin products.

In the first stage the isocyanate-modified 1,2polybutadiene glycol is admixed with glycidyl methacrylate and a polymerization initiator in a common organic solvent. The amount of GMA added will correspond to 0.04 mole to 0.48 mole per mole of pendant vinyl groups in the polymer and preferably 0.04 to 0.4 mole. The total concentration of the glycidyl methacrylate and polymer in the reaction solution is preferably maintained at 40 to 45 % by weight to preclude an excessive increase in viscosity and gellation due to the polymerization of the glycidyl methacrylate. The reaction temperature may conveniently be 100°C or lower, preferably from 60° to 80°C.

The second stage reaction commences with the addition of the second monomer. The point in time for the addition of the other polymerizable monomer is when 55 to 65 mole % of the initial glycidyl methacrylate charge has reacted. After more than 65 molar % of the glycidyl methacrylate charge has reacted, abnormal viscosity increases tend to occur and the reaction system thereby becomes difficult to control. Where the second polymerizable monomer is added after the first stage reaction has proceeded beyond 65 mole %, the resultant resin varnish lacks stability and has a relatively short pot life. Thus, a copper-clad laminate prepared with such a resin varnish, when allowed to stand for several days, will show a strong tendency to degrade. On the other hand, when the second polymerizable monomer is added before more than 55 molar % of the glycidyl methacrylate charge has reacted, the reaction of glycidyl methacrylate is inhibited to the point where unreacted GMA remains in the product thus risking a poisoning effect upon human contact. To preclude the possibility of poisoning, it is necessary for the concentration of glycidyl methacrylate in the final resin product to be 2% or less. However, where the second-stage reaction is initiated by adding the other polymerizable monomer at a point in time when 55 to 65 molar % of the glycidyl methacrylate charge has reacted, the resultant resin shows no degradation or loss in properties even after allowed to stand for several days. The second stage reaction is allowed to proceed to the point where 80 to 85 molar % of the glycidyl methacrylate charge has reacted, while effecting simultaneous reaction with the second monomer.

Examples of polymerizable monomers suitable for use in the second stage, grafting reaction include the following:

a. Styrene and its derivatives such as ar-alkylated styrenes, e.g. methylstyrene, dimethylstyrenes, isopropystyrenes, diethylstyrenes, n-butylstyrenes and t-butylstryenes; ar-alkoxylated styrenes such as methoxystyrene, α-methylstyrene; halogenated styrenes such as chlorostyrenes, dichlorostyrenes and bromostyrenes; hydroxystyrenes, and aminostyrenes;

b. Acrylic and methacrylic acids and their derivatives, such as acrylic acid, acrylates such as methyl acrylate, methacrylic acid, and methacrylates such as methyl methacrylate, ethyl methacrylate and butyl methacrylate;

Where the second monomer is styrene, chlorostyrene or a mixture thereof, the resultant resins show particularly excellent electrical properties.

As previously noted the second stage reaction is initiated when 55–65 percent of the original GMA charge has reacted. The precentage of unreacted GMA remaining in the reaction mixture can be experimentally determined by using standard titration techniques; however, analysis by titration is very time consuming and impractical. Accordingly, for a given reaction system a number of values for the amount of GMA reacted at various points in time should be determined experimentally (as by titration) and plotted against reaction time. In subsequent runs the point at which to initiate the second stage reaction can then be determined merely by reference to elapsed reaction time.

The reaction medium for both the first and second stage polymerization reactions is an organic solvent. Suitable solvents include benzene, toluene, xylene and like aromatic hydrocarbons; carbon tetrachloride, ethylene chloride, monochlorobenzene, chloroform and like chlorinated hydrocarbons; dioxane, tetrahydrofuran and similar cyclic compounds; acetone, methyl ethyl ketone and like ketones.

The amount of polymerization initiator added in the first stage is generally within the range of 1.0 to 5 % by weight, based on the weight of GMA, and preferably within the range of 2.0-3.0 % by weight. In the second stage the radical polymerization initiator is added in an amount within the range of 1.0 to 5.0 % by weight of the second polymerizable resin, and preferably 1.0 to 2.0 % by weight. Examples of radical polymerization initiators which may be used include organic peroxides such as benzoyl peroxide, methyl ethyl ketone peroxide, t-butyl perbenzoate, di-t-butyl perbenzoate, cumene hydroperoxide and dicumyl peroxide, and azo compounds such as azobisisobutyronitrile.

The product obtained by the above-described process is a graft copolymer of urethanated 1,2-polybutadiene glycol, which product is an epoxy group-containing thermosetting resin. The product is obtained in the form of a resin solution. To prepare a substrate-impregnating varnish from the reaction resin solution, either as such or after diluting with a solvent, are added a hardener for the epoxy groups and a radical polymerization initiator.

Suitable hardeners for the epoxy groups include:

a. Aliphatic amines, such as ethylenediamine, dipropylene-triamine, cyclohexylaminopropylamine, monoethanolamine, N-methyl-ethanolamine, aminoethylethanolamine and N-(2-hydroxy-propyl) ethylenediamine, b. Aromatic amines such a m-phenylenediamine, diaminodiphyenylsulfone, benzyl-dimethylamine and tris-(dimethylamino) methylbenzene, and c. Carboxylic acids and anhydrides such as phthalic anhydride, maleic anhydride, dodecenylsuccinic anhydride, trimellitic acid pyromellitic acid, tetrahydrophthalic acid, hexahydrophthalic acid, either alone or in combination with a tertiary amine.

Particularly suitable radical polymerization initiators are t-butyl perbenzoate, dicumyl peroxide and mixtures thereof.

Suitable substrates which may be used include glass cloth, glass mat, asbestos paper, synthetic fiber fabrics, synthetic fiber mats, paper and like materials. Suitable fillers include calcium carbonate, titanium oxide, clay, talc, silica, hydrated alumina, antimony trioxide and like materials. When a substrate is impregnated with the above described varnish, optionally mixed with a filler, and then dried at 50° to to 90°C, prepregs free from tackiness are obtainable. By assembling several sheets of these prepregs, one over another, superimposing a copper foil over the assembly and press-molding under heat, copper-clad laminates are obtained. The resultant copper-clad laminates show strong peel strength with respect to the copper foil, have excellent properties and solvent resistance and leave, after etching, little etching residue.

The following examples serve to further illustrate the present invention.

EXAMPLE 1

A 4-necked flask, equipped with a reflux condenser connected to a calcium chloride tube, a thermometer, a stirrer, an inert gas inlet tube and a dropping funnel, was charged with 1000 parts of 1,2-polybutadiene glycol (available from Nippon Soda Kabushiki Kaisha, Japan: NISSO-PB, G-1000) and 667 parts of toluene and the contents were heated to 110°C with stirring while purging with nitrogen gas.

In each run, a solution of tolylene diisocyanate (TDI) in toluene in the amount indicated in Table I was placed in the dropping funnel and added dropwise to the above described heated solution over a period of 30 minutes. The reaction was continued under reflux for an additional 5½ hours. The solution of the urethanated produced was cooled and 570 parts of this solution, 200 parts of glycidyl methacrylate (GMA), 6 parts of benzoyl peroxide (BPO), 214 parts of toluene and 275 parts of methyl ethyl ketone (MEK) were charged into a second reactor. The second reactor was a flask equipped with a reflux condenser, a thermometer, a stirrer, an inert gas inlet tube and a dropping funnel. The contents were heated to 70°C with stirring while purging with nitrogen gas for two hours. The % conversion of GMA at the end of the two hour period was within the range of from 55 to 60%, as shown in Table I. At the end of the initial two hour period, a mixture of 60 parts of styrene and 290 parts of chlorostyrene in which 5 parts of benzoyl peroxide had been dissolved was added and the reaction was continued at 70°C. Since the viscosity increased as the reaction proceeded, the viscosity was adjusted during this second stage reaction by appropriate addition of toluene and methyl ethyl ketone. These reaction solutions exhibited no poisoning effect due to the adequately high conversion of GMA, although in Run No. 5 formation of a gel-like product was observed. These reaction solutions were diluted with toluene and poured into a large quantity of methanol to precipitate a solid product.

For the purpose of comparison, a mixture consisting of 570 parts of the solution of the urethanated product from Run No. 3, 200 parts of GMA, 60 parts of styrene, 290 parts of chlorostyrene, 11 parts of benzoyl peroxide, 150 parts of toluene and 220 parts of methy ethyl ketone was heated to 70°C with stirring under a nitrogen purge. Since the viscosity increased as the reaction proceeded, 374 parts of toluene and 365 parts of methl ethyl ketone were added in appropriate portions to the reaction mixture over a total reaction time period of 11 hours. The % conversion of glycidyl methacrylate was found to be only 64 %, thus such a process is unsafe in operation since the unreacted monomer exerts a poisonous effect upon the human body. As can be seen from the foregoing, where the reaction is conducted with simultaneous addition of monomers, the glycidyl Table I

| Run No. | 1 | 2 | 3 | 4 | 5 |
|---|---|---|---|---|---|
| Urethanation | | | | | |
| Proportion, parts by weight | | | | | |
| G-1000 | 1000 | 1000 | 1000 | 1000 | 1000 |
| A | | | | | |
| Toluene | 667 | 667 | 667 | 667 | 667 |
| TDI | 50 | 67 | 86 | 90 | 91 |
| B | | | | | |
| Toluene | 33 | 45 | 57 | 60 | 61 |
| G-1000/TDI(molar ratio) | 2/1 | 3/2 | 7/6 | 10/9 | 11/10 |
| Reaction condition | | | | | |
| Temperature (°C) | 110 | 110 | 110 | 110 | 110 |
| Time (hr) | 6 | 6 | 6 | 6 | 6 |
| Graft reaction | | | | | |
| First stage reaction | | | | | |
| Proportion, parts by weight | | | | | |
| Solution of urethanated product | 570 | 570 | 570 | 570 | 570 |
| GMA | 200 | 200 | 200 | 200 | 200 |
| BPO | 6 | 6 | 6 | 6 | 6 |
| Toluene | 214 | 214 | 214 | 214 | 214 |
| MEK | 275 | 275 | 275 | 275 | 275 |
| Reaction condition | | | | | |
| Temperature (°C) | 70 | 70 | 70 | 70 | 70 |
| Time (hr) | 2 | 2 | 2 | 2 | 2 |
| % Conversion of GMA | 58 | 56 | 57 | 56 | 55 |
| Gelation | no | no | no | no | no |
| Second stage reaction | | | | | |
| Proportion, parts by weight | | | | | |
| Styrene | 60 | 60 | 60 | 60 | 60 |
| Chlorostyrene | 290 | 290 | 290 | 290 | 290 |
| BPO | 5 | 5 | 5 | 5 | 5 |
| Toluene | 310 | 310 | 310 | 310 | 310 |
| MEK | 310 | 310 | 310 | 310 | 310 |
| Reaction condition | | | | | |
| Temperature (°C) | 70 | 70 | 70 | 70 | 70 |
| Time (hr) | 6.5 | 7 | 7 | 7 | 7 |
| % Conversion of GMA | 82 | 83 | 81 | 83 | 82 |
| Gelation | no | no | no | Somewhat slight | Slight |
| Product | | | | | |
| Yield (%) | 85 | 84 | 83 | 84 | 85 |
| Epoxy equivalent (g/equivalent) | 760 | 785 | 770 | 780 | 755 |
| Poisonous effect of reaction solution | no | no | no | no | no | methacrylate has been found not to react to a satisfactory extent.

G-10 type and the etching residue determined, in the same manner as described above, to give an area of Table II

| Run No. | 1 | 2 | 3 | 4 | 5 |
|---|---|---|---|---|---|
| Composition of varnish, parts by weight | | | | | |
| Reaction solution | 1470 | 1490 | 1500 | 1490 | 1470 |
| Acrylsilane | 2.5 | 2.5 | 2.5 | 2.5 | 2.5 |
| Pyromellitic anhydride | 18 | 17.4 | 17.7 | 17.5 | 18 |
| t-Butyl perbenzoate | 10 | 10 | 10 | 10 | 10 |
| Properties of copper-clad laminate | | | | | |
| Copper foil peel strength (kg/cm) | 1.70 | 1.71 | 1.75 | 1.70 | 1.60 |
| Solder heat resistance (sec) | <60 | <60 | <60 | <60 | 48 |
| Etching residue (area of peak) | 493 | 172 | 134 | 120 | 121 |

The reaction solution as shown in Table I was then converted into a varnish of the composition as shown in Table II. The varnish was used to impregnate a number of glass cloths (105 g/m$^2$), which were then dried at 70°C for 20 minutes and then at 90°C for 10 minutes to produce prepregs having no blocking properties and a resin content of approximate 45 %. Fourteen such prepregs were assembled, one on top of the other, over which a copper foil (available from Fukuda Kinzoku-Haku Kogyo, T 5) was superimposed. The assembly was hot press molded at 170°C under 100 kg/cm$^2$ for 90 minutes followed by 20 minutes of cooling, to produce a copper-clad laminate of approximate 1.6 mm in thickness having the copper foil on a single side. The properties of the copper-clad laminate were as shown in Table 11. In Run No. 5, the copper foil peel strength was low and the solder heat resistance was also inferior. In Run No. 1, the etching residue was more than in other runs. The etching residue was determined on the basis of the area of peak, in the fluorescent X-ray analysis, which peak is indicative of the magnitude of absorption by copper, and the numerical value shown in Table II is an average one, taken from ten measured values. In addition, microscopic observation also gave similar results.

For the purpose of comparison, a single side-copper-clad laminate was made from an epoxy resin of the peak of 515, indicative of a relatively large amount of etching residue. Again for the purpose of comparison, Run No. 3 was followed with the same proportions of reactants as shown in Table I but with the exception that the first stage reaction was conducted for three hours, to obtain a molar % conversion of GMA of 78 %. Subsequently, the second stage reaction was carried out for 8 hours, whereupon the % conversion of GMA reached 88 % and there was obtained a resin having an epoxy equivalent of 720. When the resin was used in making a copper-clad laminate in the same manner as in Example 1, the resultant laminate exhibited excellent properties: a copper foil peel strength of 1.75 kg/cm, solder heat resistance of longer than 60 seconds and etching residue of 106. However when the varnish was allowed to stand for five days and then used in making a copper-clad laminate the resultant laminate showed a decreased copper foil peel strength of 1.56 kg/cm, indicative of lack of stability in the pot life of the resin.

EXAMPLE 2

Using the urethanated product from Run No. 3 in Example 1 a procedure similar to that of Example 1 was followed using the proportions and reaction conditions as stated in Table III to give the results also shown in Table III.

Table III

| Run No. | 6 | 7 | 8 | 9 | 10 |
|---|---|---|---|---|---|
| First stage reaction | | | | | |
| Proportion, parts by weight | | | | | |
| Solution of urethanated product | 570 | 570 | 570 | 570 | 570 |
| GMA | 30 | 56 | 114 | 227 | 284 |
| BPO | 0.9 | 1.7 | 3.4 | 6.8 | 8.5 |
| Toluene | 19 | 36 | 74 | 148 | 286 |
| MEK | 247 | 264 | 302 | 377 | 515 |
| Reaction condition | | | | | |
| Temperature (°C) | 70 | 70 | 70 | 70 | 70 |
| Time (hr) | 1.5 | 1.5 | 1.5 | 2 | 2.5 |
| % Conversion of GMA | 57 | 56 | 55 | 57 | 57 |
| Gelation | no | no | no | Slight | Somewhat large |
| Second stage reaction | | | | | |
| Proportion, parts by weight | | | | | |
| Styrene | 79 | 69 | 62 | 50 | 42 |
| Chlorostyrene | 421 | 399 | 354 | 266 | 222 |
| BPO | 7.5 | 7.0 | 6.2 | 4.7 | 4.0 |
| Toluene | 403 | 381 | 348 | 281 | 147 |
| MEK | 403 | 381 | 347 | 280 | 147 |
| Reaction condition | | | | | |
| Temperature (°C) | 70 | 70 | 70 | 70 | 70 |
| Time (hr) | 7 | 7 | 7 | 7.5 | 8 |
| GMA/Styrene plus Chlorostyrene (molar ratio) | 5.2/ 94.8 | 10/ 90 | 20.2/ 19.8 | 40/ 60 | 50/ 50 |
| % Conversion of GMA | 85 | 83 | 84 | 83 | 81 |
| Gelation | no | no | no | Slight | Somewhat |

Table III-continued

| Run No. | 6 | 7 | 8 | 9 | 10 |
|---|---|---|---|---|---|
| Product | | | | | large |
| Yield (%) | 87 | 85 | 84 | 85 | 83 |
| Epoxy equivalent (g/equivalent) | 4250 | 2300 | 1090 | 570 | 490 |
| Poisonous effect of reaction solution | no | no | no | no | Yes but slight |

In a similar manner in Example 1, the properties of a single side-copper-clad laminate were measured to give the results as shown below in Table IV.

Table IV

| Run No. | 6 | 7 | 8 | 9 | 10 |
|---|---|---|---|---|---|
| Composition of varnish, parts by weight | | | | | |
| Reaction solution | 1440 | 1470 | 1490 | 1470 | 1510 |
| Acrylsilane | 2.5 | 2.5 | 2.5 | 2.5 | 2.5 |
| Pyromellitic Anhydride | 3.2 | 6.0 | 12.5 | 24 | 28 |
| t-Butyl perbenzoate | 10 | 10 | 10 | 10 | 10 |
| Properties of copper clad laminate | | | | | |
| Copper foil peel strength (kg/cm) | 1.42 | 1.67 | 1.71 | 1.68 | 1.49 |
| Solder heat resistance (sec) | 35 | >60 | >60 | >60 | 52 |
| Etching residue (area of peak) | 59 | 70 | 86 | 99 | 79 |

The invention may be embodied in other specifiic forms without departing from the spirit or essential characteristics thereof. The present embodiments are therefore to be considered in all respects as illustrative and not restrictive, the scope of the invention being indicated by the appended claims rather than by the foregoing description, and all changes which some within the meaning and range of equivalency of the claims are therefore intended to be embraced therein.

We claim:

1. A process for the preparation of a solid graft copolymeric thermosetting resin comprising:
    reacting liquid 1,2-polybutadiene glycol with a diisocyanate chain extender in an organic solvent solution, in a molar ratio of 2/3 to 9/10 mole of diisocyanate per mole of hydroxy groups in said gylcol, to produce a urethanated prepolymer substrate;
    adding glycidyl methacrylate to a solvent solution of said urethanated prepolymer in a ratio of 0.04 to 0.48 mole of said glycidyl methacrylate per mole of pendant vinyl groups in said prepolymer and a free radical polymerization initiator to form a first stage reaction mixture;
    reacting said first stage mixture until 55 to 65 weight % of the glycidyl methacrylate added has reacted with the prepolymer; and
    then adding a second polymerizable monomer to said first stage reaction mixture and reacting same to obtain a graft copolymeric thermosetting resin containing 0.35 to 1.1 moles total of glycidyl methacrylate and second monomer per mole of pendant vinyl groups in the prepolymer substrate, said second monomer being a monomer different from said glycidyl methacrylate.

2. The process of claim 1, wherein said liquid 1,2-polybutadiene glycol has a molecular weight of from 1000 to 3000, a pendant double bond content of at least 50 %, and at least 60 % of the terminal groups are hydroxy groups.

3. The process of claim 2, wherein the molar ratio of the hydroxy groups in said 1, 2-polybutadiene glycol to the isocyanate groups in said diisocyanate chain extender is 3:2 to 10:9.

4. The process of claim 3, wherein said second polymerizable monomer is styrene, chlorostyrene or a mixture thereof.

5. The process of claim 1, wherein the molar ratio of the glycidyl methacrylate to said polymerizable monomer is 1:9 to 4:6.

6. A composition comprising, in solvent solution, the solid graft copolymeric thermosetting resin produced by the process of claim 1, a radical polymerization initiator, and an epoxy hardener.

7. A process for the production of a graft copolymeric thermosetting resin having an isocyanate extended 1,2-polybutadiene glycol as the polymeric substrate, said substrate containing 2/3 to 9/10 mole of diisocyanate per mole of hydroxy groups in the original glycol, said process comprising:
    admixing the isocyanate extended 1,2-polybutadiene glycol, glycidyl methacrylate and a free radical polymerization initiator in a solvent solution, said glycidyl methacrylate being present in an amount within the range of 0.04 to 0.48 mole per mole of pendant vinyl groups in said polymeric substrate;
    reacting said admixture until 55 to 65 weight % of the glycidyl methacrylate has reacted with said polymeric substrate; and
    then adding a second polymerizable monomer to the reaction mixture to obtain the graft copolymeric thermosetting resin said second monomer being different from said glycidyl methacrylate.

8. A solid graft copolymeric thermosetting resin prepared by the process of claim 7.

* * * * *